SEQUENTIAL COINCIDENT SELECTOR SYSTEMS AND APPARATUS

Filed July 19, 1956 3 Sheets-Sheet 1

INVENTOR
GEORGE L. GOUGH
BY Emery Robinson
ATTORNEY

Aug. 22, 1961 G. L. GOUGH 2,997,532

SEQUENTIAL COINCIDENT SELECTOR SYSTEMS AND APPARATUS

Filed July 19, 1956 3 Sheets-Sheet 2

INVENTOR
GEORGE L. GOUGH

BY Emery Robinson
ATTORNEY

Aug. 22, 1961 G. L. GOUGH 2,997,532

SEQUENTIAL COINCIDENT SELECTOR SYSTEMS AND APPARATUS

Filed July 19, 1956 3 Sheets-Sheet 3

INVENTOR
GEORGE L. GOUGH

BY Emery Robinson
ATTORNEY

United States Patent Office 2,997,532

Patented Aug. 22, 1961

2,997,532

SEQUENTIAL COINCIDENT SELECTOR SYSTEMS AND APPARATUS

George L. Gough, Glenview, Ill., assignor to Teletype Corporation, Chicago, Ill., a corporation of Delaware Filed July 19, 1956, Ser. No. 598,891

11 Claims. (Cl. 178—2)

Figure 1:
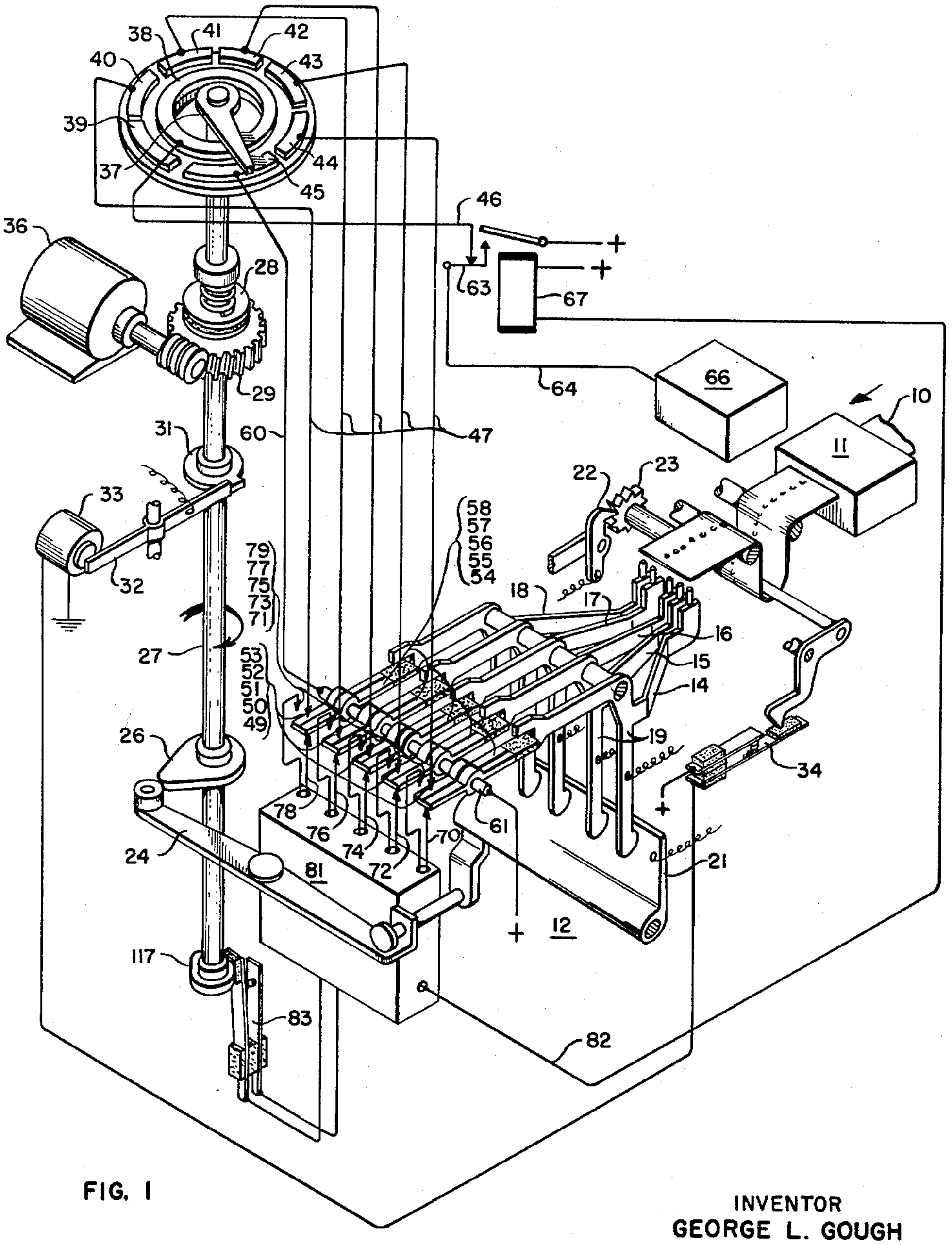

The present invention pertains to sequential coincidence selector systems and more particularly to a system having facilities therein for sensing data impressed in a record medium and accordingly sorting such data in concordance with accompanying characteristic indicia recorded in the medium to precede the main body of data.

In this processing of data obtained from a plurality of sources or from a single source, it often becomes necessary to effectuate the sorting thereof in accordance with various categories of subject matter. An example of such a requirement exists in certain automatic accounting systems wherein a great number of sales are recorded as permutatively arranged transverse rows of perforations in a common tape. In order to utilize this mass of recorded data, facilities must be provided to correlate the recorded data in accordance with the customer names for billing or other purposes.

Further, the urgency of sorting vast amounts of data is present in automatic telegraph transmission systems. In such systems incoming messages from a plurality of outlying or local sources are recorded as perforations in a single tape at a central office. Facilities must be provided at the central office for sorting the messages in accordance with the ultimate destinations prior to transmission.

It is a primary object of the present invention to rapidly and economically sort recorded intelligence in accordance with predetermined identifying intelligence preceding the main body of the recorded intelligence.

It is a further object of the instant invention to provide simple and reliable facilities for sensing signals (transverse rows of permutatively arranged perforations formed in a tape) and, upon coincidence thereof with respect to a sequentially operable circuit, to record the subsequent intelligence signals.

Another object of the invention resides in the provision of settable instrumentalities to vary the sequence and number of coincidence signals required to operate a local apparatus.

A more finite object of the invention is the provision of a sensing device having associated therewith a plurality of selectively settable circuits that are sequentially rendered effective, in conjunction with the operation of a plurality of stepping switches, to determine the presence of a predetermined sequence of signals in a tape.

In adjunct with the last object, it is still a further object of this invention to provide instrumentalities for restoring the stepping switches to an initial position upon sensing any signals other than those in the predetermined sequence.

With these and other objects in view, the present invention contemplates a plurality of recording stations arranged in tandem fashion and having instrumentalities therein to successively sense a common tape. The tape has perforated therein a great number of telegraph messages destined for the various recording stations. Each message is preceded by a sequence of address or other identifying signals. Associated with each station sensing device are banks of manually settable contact devices adapted to be set in accordance with a predetermined sequence of address signals that are indicative of the recording apparatus at that station. A stepping switch functions to successively associate each bank of contact devices with the sensing device, whereupon coincidence between the sensed signal and the setting of the contact bank results in a further advancement of the stepping switch. Upon a predetermined number of successive advancements of the stepping switch, an output circuit is operated to connect the sensing device to a recording apparatus such as a perforator or telegraph printer. Thereafter, the subsequent signals sensed in the tape are effective to control the recording apparatus. Signals are successively recorded until such time as a disconnect signal is sensed in the tape, whereupon facilities are actuated to disconnect the recording apparatus from the sensing means. A preconcerted series of signals may also be employed to effectuate the disconnect operations.

Whenever, during a sequential selection cycle, a signal is sensed that is not in accord with the setting of the associated bank of contact devices, the stepping switch is restored to an initial position. It may be thus comprehended that by arranging a series of sorting devices in tandem, a plurality of messages formed in a single tape may be effectively sorted in accordance with identifying signals preceding each message.

Figures 2, 4:
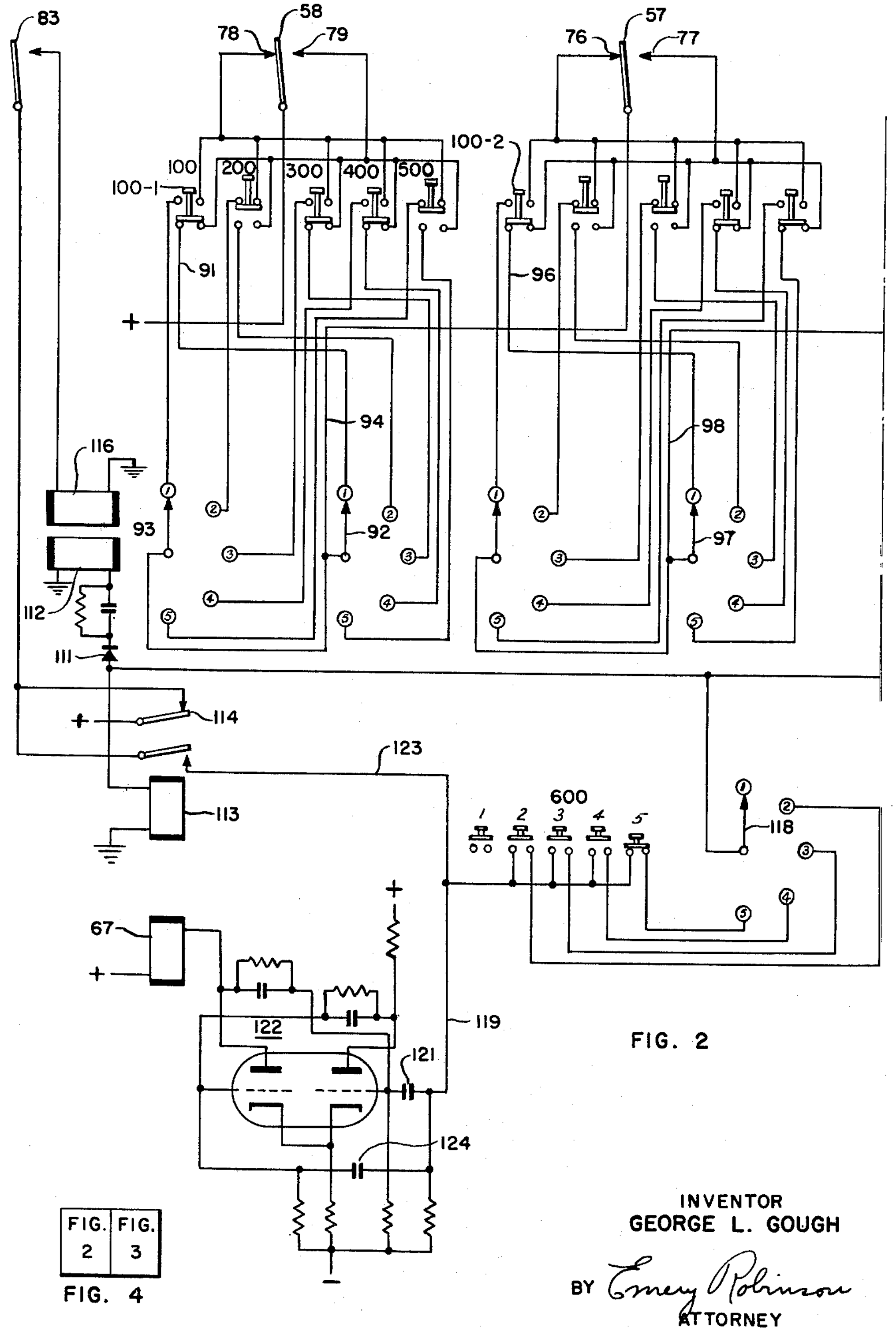
Figure 3:
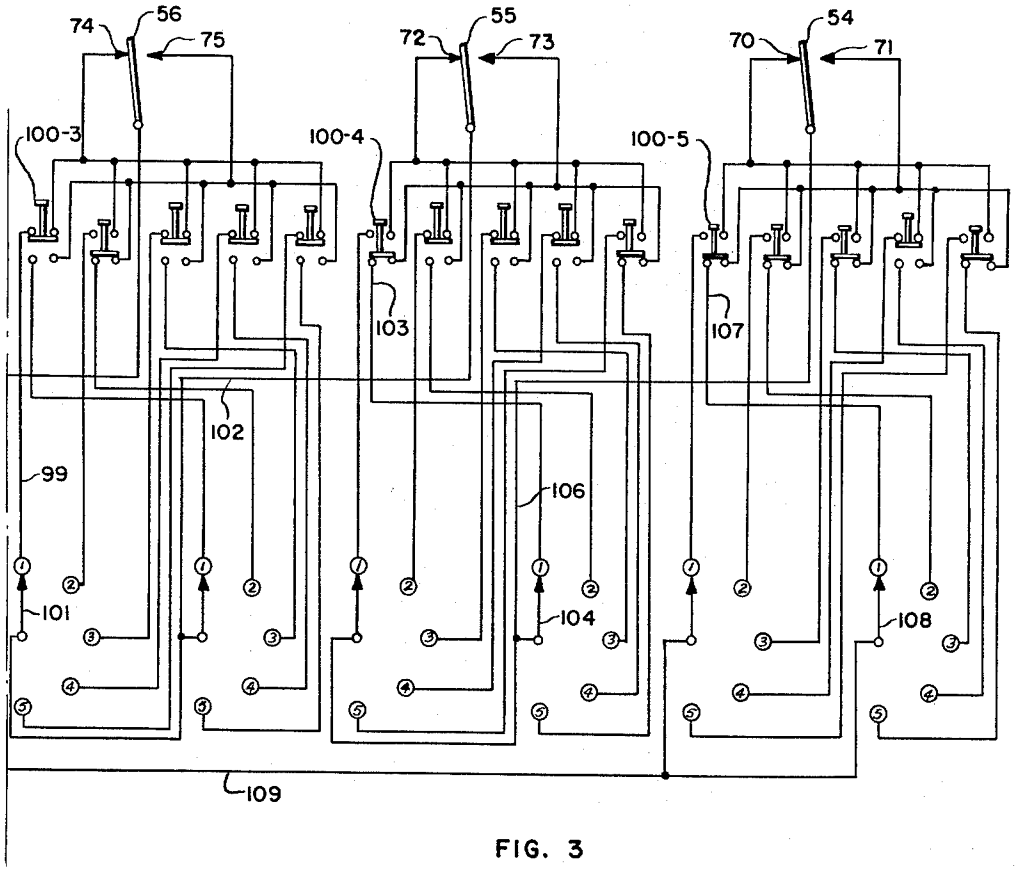
Figure 5:
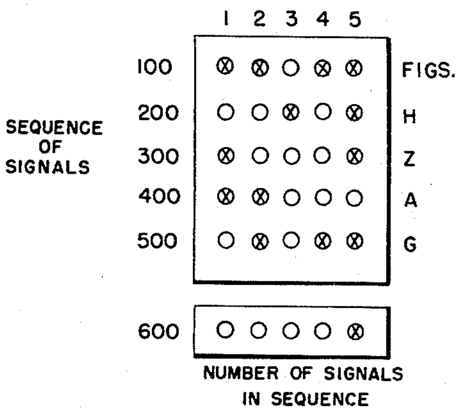

Other objects and advantages of the present invention will be apparent from the following detailed description when considered in conjunction with the accompanying drawings wherein:

FIG. 1 is a perspective view of a two station system (partially in detail) embodying the principal features of the present invention;

FIGS. 2 and 3, when assembled in the manner shown in FIG. 4, depict a sequential selector circuit adapted to be incorporated in each of the stations shown in FIG. 1; and FIG. 5 is an illustration showing banks of push buttons for selectively setting the circuits shown in FIGS. 2 and 3 to respond to a predetermined sequence of address or identifying signals.

Referring to FIG. 1 there is shown a system for sorting messages formed in a tape 10 wherein each message is preceded by a predetermined sequence of identifying signals. Each signal of the message and the identifying sequence consists of a transverse row of perforations permutatively arranged in accordance with the well known Baudot code. Upon tape 10 being advanced through a first sorting station 11, all messages preceded by the characteristic sequence of identifying signals designating station 11 are recorded at that station by any suitable recording mechanism such as a telegraph printer or perforator. Messages that are not preceded by the same sequence of identifying signals are passed through the station 11 without recordation and are advanced to a second sorting station generally designated by the reference number 12.

Located at the sorting station 12 is a tape sensing and transmitting device of the general type shown in Teletype Bulletin Number 141, Issue 3, issued March 1942, by the Teletype Corporation of Chicago, Illinois. Station 12 is substantially identical with the first station 11 and any other sorting station that may be desired to be included in the system. The sensing device includes a plurality of sensing levers 14 to 18 for probing for the perforations in the tape. Each sensing lever has a spring biased depending arm 19 that engages a common bail 21. The bail, when oscillated, is adapted to actuate a tape feed mechanism generally represented by a pawl and ratchet 22 and 23. Bail 21 is adapted to be oscillated through a single cycle of operation during the presence of each transverse row of perforations in register with the sensing pins on the levers 14 to 18. Oscillation of the bail 21 is attained through the instrumentality of a linkage including a lever 24 that in turn is actuated by a cam 26.

Cam 26 is fixed to and adapted to rotate with a shaft 27. Also mounted on the shaft 27 is a friction clutch 28 adapted to selectively connect a worm gear 29 with the shaft. In addition, the shaft 27 has mounted thereon a lug disc 31. The lug on this disc is adapted to be engaged by a stop lever 32 that is positioned by an electromagnet 33. An energizing circuit is provided for the magnet 33 and includes a taut tape switch 34. Upon sufficient slack tape existing between the stations 11 and 12, the taut tape switch 34 is closed to energize the magnet 33 whereupon the stop lever is drawn up to permit rotative power to be imparted from a motor 36 through the worm gear 29 and through the clutch 28 to the shaft 27.

Shaft 27 has fixed thereto a brush arm 37 adapted to successfully span a commutator ring 38 with a series of seven signal generating segments 39, 40, 41, 42, 43, 44 and 45. These elements form a transmitting distributor to impress signal conditions on an output lead 46. Segment 39 is not connected to any battery source and as a consequence the passing of the brush arm 37 thereover results in the generation of a signal condition indicative of a start impulse. The segments 40, 41, 42, 43 and 44 are connected over leads 47 to fixed contacts 49, 50, 51, 52 and 53 adapted to be selectively closed by the right-halves of movable contact swingers 54, 55, 56, 57 and 58. The contact swingers are constructed of two sections of conductive material separated by and joined by a thin section of insulating material. Each of the contact swingers is adapted to be controlled in its positionment by a bifurcated extension of a sensing lever. Inasmuch as the sensing levers are positioned in accordance with the presence or absence of perforations formed in the tape 10, the associated contact swingers are likewise accordingly positioned to effectuate a permutative closure of the fixed contacts. It may be thus appreciated that as the brush arm 37 sweeps over the segments 40 to 44, current and no-current signal impulses are generated and impressed on lead 46 in accordance with the perforations formed in the tape. The segment 45 is connected over a lead 60 through a pivot shaft 61 to a source of battery; manifestly, each passage of the brush arm over the segment 45 results in a generation of a current impulse. This invariably generated current pulse is indicative of a stop impulse.

During each cycle of operation of the signal generator, there is impressed on the lead 46 a no-current (start) impulse and thereafter a series of five intelligence impulses (current or no-current) followed by a stop impulse. It will be noted that the lead 46 is connected through a make before break contact device 63 to a second lead 64 running to a recording apparatus generally designated by the reference number 66. If the make before break contact device is not drawn up, the generated signals will be recorded by apparatus 66.

Considering now the invention in its broader aspects; when tape 10 is first fed into the sorting station 12, a relay 67 is energized to draw up the make before break contact and thereby preclude the passage of signals from the lead 46 to the lead 64; manifestly, the sensed indicia is ineffective to control the recording apparatus.

It will be noted that each of the left-hand sections of the contact swingers 54 to 58 have associated therewith a pair of marking and spacing fixed contacts designated by the reference numerals 70 through 79, respectively. These left-hand sections of the contact swingers are insulated from the pivot shaft 61. When a predetermined sequence of identifying signals are sensed in the tape 10, the contacts 70 through 79 are successively closed to effect the operation of a selectively operable device 81. Operation of the device 81 results in the deenergizing of a lead 82 running to the relay 67. As a consequence thereof the make before break contact 63 is released and the lead 46 is again connected to the lead 64. Thereafter, the perforations sensed in the tape by the sensing levers 14 to 18 are effective to control the impression of the start-stop type Baudot code signals on the lead 64. These signals control the recording apparatus 66 to make a permanent record of the signals.

If during the sequential operation of the selective control unit 81, a signal condition is sensed in the tape other than that in the predetermined sequence, then a circuit including contacts 83 is operated to restore the selective control unit 81 to its initial condition whereupon a current condition is impressed on the lead 82 to thereby energize the relay 67. Make before break contact 63 will again be drawn up to interrupt the transmitting circuit running to the recording apparatus 66.

Reference should now be had to FIGS. 2 and 3 for an understanding of the details of the selectively operable device 81. Assume for purposes of illustration that the required sequence of signals in the tape 10 for operation of station 12 are indicative of the signals, Figures H, Z, A and G. In order to set the selective control unit 81 to respond to this sequence of signals a series of push buttons are operated. The tops of these push buttons are shown in FIG. 5 and those push buttons designated by the "X" circles indicate buttons that have been depressed. Now, in accordance with the Baudot code, the signal indicative of Figures consists of the first, second, fourth and fifth code positions being marking, consequently buttons Number 1, 2, 4 and 5 of the first row 100 are depressed. In a like manner other rows of push buttons are depressed to represent the remaining characters of the sequence; namely, H, Z, A, G. At the bottom of FIG. 5, there is shown a row of push buttons that are utilized to set up the number of characters required in the selecting sequence. In the illustrated example, five characters are utilized, hence the number 5 push button is depressed.

Referring back to FIGS. 2 and 3 the five rows or sets of push buttons are indicated by the reference numbers 100, 200, 300, 400 and 500. It will be noted that the push buttons of set 100 are identified in FIGS. 2 and 3 by reference numerals 100–1, 100–2, 100–3, 100–4 and 100–5 and it will be understood that the push buttons of the remaining sets of buttons could be similarly identified. When the sensing device ascertains a figures signal in the tape 10, the contact swingers 58 to 54 are set so that the left-hand sections of swingers 58, 57, 55 and 54 are moved against the fixed contacts 79, 77, 73 and 71, respectively. With such a setting, a circuit is completed from positive battery (FIG. 2), through the swinger 58, through the fixed contact 79, through the push button 100–1, over a lead 91, through a wiper 92 of a stepping switch (generally designated by the reference numeral 93), over a lead 94, through the contact swinger 57, through the fixed contact 77, through the push button 100–2, over a lead 96, through a wiper 97, over a lead 98, through the contact swinger 56, through the fixed contact 74, through the push button 100–3, over a lead 99, through a wiper 101, over a lead 102, through the contact swinger 55, through the fixed contact 73, through the push button 100–4, over a lead 103, through a wiper 104, over a lead 106, through the contact swinger 54, through fixed contact 71, through the push button 100–5, over a lead 107, through a wiper 108, over a lead 109, through a diode 111, through a stepping magnet 112 of the stepping switch 93 to ground. Energization of the stepping magnet 112 causes the associated wipers to advance one increment, thereby becoming associated with the push buttons 200.

The construction of the stepping switch is such that two wipers and two banks of contacts are associated with each contact swinger 58 to 54. Whenever a contact swinger is positioned in accordance with a perforation in the tape, the associated right-hand bank of stepping switch contacts must be associated with a push button that has been depressed in order for the circuit to lead 109 to be completed. In a like manner, when a contact swinger is positioned by a nonperforated section of tape 10, the associated left-hand bank of stepping switch contacts must be associated with a push button that has not been depressed in order for the completion of the circuit running to lead 109.

Application of current over the lead 109 also effectuates the energization of a relay 113 that pulls up a contact 114. Contact 114 is included in a circuit that also includes the contact 83 and a restoring magnet 116. In situations where the magnet 116 is energized, the wipers of the stepping switch 93 will be restored to an initial position. This situation will occur whenever the magnet 113 is de-energized and the contact 83 is closed. The contact 83 is controlled by a cam 117 (see FIG. 1) mounted on the shaft 27. The contour of the cam 117 is selected to close the contact 83 following each withdrawal of the sensing levers from the sensing position. It will be thus appreciated that so long as the relay 113 is energized during each sensing operation, the restoring magnet 116 will be precluded from operation; consequently, each energization of the stepping magnet 112 results in the advancement of all of the wipers in the stepping switch 93.

The circuits associated with each of the push buttons 200, 300, 400 and 500 are quite similar to the circuits associated with push button 100. Hence an understanding of their operation may be readily had from an examination of the circuit diagrams in FIGS. 2 and 3. If, during subsequent operations of the sensing device, coded perforations indicative of the letters H, Z, A, G, are successively sensed, the push buttons 200, 300, 400 and 500 will successively complete circuits through the stepping switch to energize the lead 109 and the relay 113. The stepping switch will thus advance a total of five increments.

Included as part of the stepping switch 93 is a wiper 118. The contacts associated with the wiper 118 are selectively connected to a series of push buttons generally designated by the reference numeral 600. Push buttons 600 are shown in FIG. 5 and as previously discussed are utilized to determine the number of signals required to be sensed in a predetermined sequence in order to effectuate a recording of subsequent signals. In the assumed illustration the number five push button has been depressed. Consequently when the wiper 118 has advanced five increments a circuit is completed through the number five push button over a lead 119, through a differentiating condenser 121 to the right-hand grid of a bistable flip-flop circuit 122. Completion of this circuit effectuates the impression of a positive potential on the grid of a right-hand triode of the flip-flop circuit thereby placing this triode in a conductive state. Conduction of the right-hand triode is followed by a de-energization of the left-hand triode. It will be noted that when the left-hand triode was in a conductive condition, energizing current was supplied to the relay 67 which will be recalled as the device for holding the make before break contact 63 in an open condition. When the left-hand triode of the flip-flop circuit 122 is de-energized, the relay 67 is also de-energized thereby releasing the make before break contact 63. Closure of the contact 63 thereupon connects the lead 46 to the lead 64 and as a result of this operation permutations of perforations sensed by the sensing levers 14 to 18 are effective to control the impression of start-stop signals on the lead 64. As previously discussed these signals will control the actuation of the recording apparatus 66 to make a permanent record of the signals sensed in the tape 10.

Engagement of the wiper 118 with its last contact also causes a circuit to be conditioned over a lead 123. It will be recalled that the contact 114 is open upon the sensing of the fifth signal in the selecting sequence, but now positive battery is impressed on lead 123 and it will also appear at the contact 83. When contact 83 is closed following the sensing operation, battery is passed to the restoration magnet 116 and as a result the stepping switch 93 is restored to an initial position. However, the recording apparatus 66 will continue to record the subsequent signals so long as the flip-flop circuit 122 has its left-hand triode in a non-conducting condition to preclude energization of the relay 67. The flip-flop circuit cannot be restored to the initial condition until such time as another positive battery condition is impressed on lead 119.

Signals will be continually recorded by the apparatus 66 until such time as the sensing device again ascertains the Figures H, Z, A, G sequence whereupon the wiper 118 will again engage its last contact to again apply positive battery through the number 5 push button over the lead 119, through a differentiating condenser 124 to the grid of the left-hand triode of the flip-flop circuit 122. Appearance of a differentiated positive pulse on the grid effectuates a re-energization of the left-hand triode thereby causing re-energization of the relay 67 to again cause the reopening of the make before break contact 63.

It may be appreciated that the selecting sequence of signals may be varied by repositionment of the push buttons 100 to 500 to match any predetermined sequence of signals impressed in the tape 10. The number of signals in the sequence required to connect the recording apparatus 66 may be varied by merely closing any of the other push buttons 600.

It is to be understood that the above-described arrangements and applications of circuits, and construction of elemental parts, are simply illustrative of an application of the principles of the invention and many other modifications may be made without departing from the spirit and scope of the invention.

What is claimed is:

1. In a system for sorting messages in accordance with identifying signals preceding the signals of each message, means for recording the message signals, means for precluding signal responsive operation of said recording means, and means responsive to a predetermined sequence of identifying signals preceding and following the signals of a message for respectively disabling and enabling said precluding means.

2. In a system for sorting messages in accordance with identifying signals preceding the signals of each message, means for recording the message signals, means for withholding message signals from said recording means, and means responsive to a predetermined sequence of identifying signals preceding and following the signals of a message for respectively disabling and enabling said signal withholding means.

3. In a sequence selective control circuit, a normally unoperated output circuit, a plurality of stepping switches, means responsive to each signal of a predetermined sequence of signals for advancing the stepping switches, means for restoring the stepping switches to an initial position upon receipt of any signal not in said predetermined sequence, means actuated by a predetermined advancement of the stepping switches for operating the output circuit, and means for selectively varying the number of advancements of the stepping switches required to operate the output circuit.

4. In a sequence selective control circuit as defined in claim 3, means for selectively varying the predetermined sequence of signals required to operate the output circuit.

5. In a system for selectively recording data impressed in a record medium, a signal responsive recording apparatus, a flip-flop circuit having two stages, means for rendering one of said stages conductive, means including said conductive stage for precluding signal responsive operation of the recording apparatus, means responsive to a predetermined sequence of data in said record medium for operating said flip-flop circuit to render the conductive stage nonconductive to disable said precluding means, means responsive to subsequent data for accordingly operating said recording apparatus, said means for operating said flip-flop circuit responsive to a reoccurrence of said predetermined sequence of data for restoring said flip-flop circuit to its initial condition to re-enable said precludng means.

6. A selective control system for sorting messages in accordance with identifying signals preceding each message, which comprises members selectively positioned in accordance with both message and identifying signals, a bank of contact devices associated with each selectively positioned member, means for setting said banks of contact devices in accordance with a predetermined sequence of identifying signals, an output lead, a stepping switch for successively connecting each bank of contact devices to said output lead, means connected to said output lead for advancing the stepping switch upon coincidence between the setting of the contact devices and the selectively positioned members, a normally ineffective recording device for said signals, and means actuated by a predetermined number of successive advancements of said stepping switch for rendering said recording device effective to record message signals.

7. In a system for sorting data in accordance with identifying data preceding each body of intelligence data, contact means positioned in accordance with said data, a stepping switch associated with said positioned means, a set of push button contact devices set in accordance with said identifying data, means adapted to advance the stepping switch, a circuit including said contact means, push buttons and stepping switch for actuating said stepping switch upon coincidence between identifying data and the setting of the push buttons, means actuated by a predetermined advancement of the stepping switch for recording the intelligence data, and means actuated upon a noncoincidence of said identifying data with the setting of the push buttons for restoring said stepping switch to an initial position.

8. In a tape reading apparatus, a plurality of sensing members for ascertaining the presence or absence of intelligence perforations in a message tape, a group of selectively settable means associated with each sensing member, a plural contact stepping switch associated with each group of settable means, means adapted to step the stepping switch to successively connect each settable means in each group with one contact in the associated stepping switch, means operated by a coincidence of the positionment of the sensing members and the setting of the settable means for actuating the stepping means, and means resetting the sequence switches to an initial position upon a noncoincidence of the positionment of the sensing members and the settable means.

9. In a system for sorting messages in tape in accordance with address signals formed in the tape to precede each message, a plural contact tape reader, a transmitting distributor controlled by said tape reader, a recording device controlled by said transmitting distributor, means for precluding control of the recording device by the transmitting distributor, a bank of push button contacts associated with each contact of said tape reader, said push button contacts being set to correspond with said address signals, a stepping switch for successively connecting one push button contact of each bank with said contacts of said tape reader, means actuated by a coincidence between each address signal and the setting of the associated push button contacts for advancing the stepping switch to associate the next push button contact of each bank with said contacts of the tape reader, and means operated by a predetermined advancement of the stepping switch for rendering ineffective the precluding means whereby the subsequent message is transmitted by the transmitting distributor to the recording device.

10. In a system for sorting messages formed as permutatively arranged rows of perforations in a tape, a tape sensing device having contact swingers positioned in accordance with the perforations in each row, a transmitting distributor controlled by the positionment of said contact swingers, a recording device operated by said transmitting distributor, means for precluding operation of said recording device, a pair of marking and spacing contacts adapted to be selectively closed by each contact swinger, a first bank of contacts associated with each marking contact, a second bank of contacts associated with each spacing contact, push buttons for selectively closing contacts in both banks in accordance with an identifying code, a multi-wiper stepping switch having a row of contacts associated with each bank of marking and spacing contacts, a circuit including said push button contacts and rows of stepping switch contacts adapted to be successively operated by said tape reader ascertaining a predetermined sequence of rows of perforations in the tape, means actuated by said circuit for advancing said stepping switch, and means operated by a predetermined number of successive advancements of said stepping switch for rendering said precluding means ineffective.

11. In a tape reading apparatus, a plurality of members for sensing transverse rows of permutatively arranged perforations in a message tape, each row of perforations being representative of one intelligence signal, a recorder, means for isolating said recorder against signal response and for rendering said recorder signal responsive, means actuated by the sensing members upon the ascertainment of a predetermined number of transverse rows of preconcerted premutative perforations for disabling said isolating means, means for selectively changing the number of rows that must be sensed to disable the isolating means, and selectively operable means for changing the preconcerted perforations that must be sensed to disable said isolating means.

References Cited in the file of this patent

UNITED STATES PATENTS

| | | |
|---|---|---|
| 2,416,445 | Jensen | Feb. 25, 1947 |
| 2,614,169 | Cohen | Oct. 14, 1952 |
| 2,667,533 | Zenner | Jan. 26, 1954 |
| 2,668,875 | Shepard | Feb. 9, 1954 |
| 2,669,602 | Salmon | Feb. 16, 1954 |
| 2,680,239 | Daniels | June 1, 1954 |
| 2,721,990 | McNaney | Oct. 25, 1955 |
| 2,787,654 | Peery | Apr. 2, 1957 |
| 2,805,283 | Stiles | Sept. 3, 1957 |